United States Patent [19]
De Kock et al.

[11] Patent Number: 5,890,568
[45] Date of Patent: Apr. 6, 1999

[54] CONTINUOUSLY VARIABLE TWIN-TUBE SHOCK DAMPER

[75] Inventors: Cornelis De Kock, Oud Beijerland; Paul De Kock, Numansdorp, both of Netherlands

[73] Assignee: Koni B.V., Netherlands

[21] Appl. No.: 849,783

[22] PCT Filed: Nov. 30, 1995

[86] PCT No.: PCT/NL95/00408

§ 371 Date: Jun. 9, 1997

§ 102(e) Date: Jun. 9, 1997

[87] PCT Pub. No.: WO96/08950

PCT Pub. Date: Mar. 28, 1996

[30] Foreign Application Priority Data

Dec. 19, 1994 [NL] Netherlands .......................... 9402150

[51] Int. Cl.⁶ .................................................. F16D 57/00
[52] U.S. Cl. .................. 188/266.5; 188/281; 188/322.14
[58] Field of Search ............................. 188/266.2, 266.5, 188/266.6, 281, 317, 318, 315, 322.14, 322.22

[56] References Cited

U.S. PATENT DOCUMENTS 5,386,893 2/1995 Feigel .............................. 188/322.14 X
5,400,877 3/1995 Kircher et al. ................. 188/322.14 X

FOREIGN PATENT DOCUMENTS

| 0556925 | 8/1993 | European Pat. Off. . |
| 3737173 | 8/1993 | Germany . |
| 621630 | 5/1949 | United Kingdom . |
| 89/09891 | 10/1989 | WIPO ............................. 188/322.14 |
| 9212359 | 7/1992 | WIPO . |
| 9216772 | 10/1992 | WIPO . |

*Primary Examiner*—Lee W. Young
*Attorney, Agent, or Firm*—Bachman & LaPointe, P. C.

[57] ABSTRACT

A twin-tube shock damper has a hollow piston rod (5) which extends towards the top of the working cylinder (1), a baseplate (8) which closes off the working cylinder and a disc (7) which is arranged inside the working cylinder between the piston (4) and the baseplate and has one or more passages (16) and a non-return valve (17) which allows upward flow through the passages, a central tube (10), a connection (11) between the hollow piston rod and the space above the piston, a damping valve (21) which operates in one direction of flow and servo-control means having an excitation chamber (18) and an excitable coil (30). A control valve in the form of a hollow piston (25) movable in a control valve cylinder (22) provided with orifices (24) and a hollow shaft (27) guided in a valve shaft guide (26) provided with orifices (28) are located in the excitation chamber. Both the control valve cylinder and the control valve are pushed by spring means (23, 29) in the direction of the damping valve body (17).

6 Claims, 3 Drawing Sheets

CONTINUOUSLY VARIABLE TWIN-TUBE SHOCK DAMPER

The invention relates to a continuously variable twin-tube shock damper comprising:

an oil reservoir between a working cylinder and an outer tube, a piston which is movable in the working cylinder and has a passage and a non-return valve which permits only an upward flow through the said passage with negligible damping capacity, a hollow piston rod which extends towards the top of the working cylinder, a baseplate which closes off the working cylinder, a disc which has one or more passages and is arranged inside the working cylinder between the piston and the baseplate, a non-return valve which permits only upward flow through said passages, a central tube which protrudes through the piston into the hollow piston rod and through the said disc, a connection between the hollow piston rod and the space above the piston, a damping valve which operates in only one direction of flow and is arranged between the bottom of the central tube, servo-control means in order to control the flow resistance exerted by the damping valve as a function of electrical signals which are at least related to the movement of bodywork and/or chassis, which servo-control means comprise an excitation chamber as well as a coil positioned in the vicinity of a permanent magnet, which coil can be excited by the said electrical signals in order to control the pressure in the excitation chamber below the valve body of the damping valve, a control valve having the form of a hollow piston which is arranged in the excitation chamber, wherein the position of the control valve can be changed by excitation of the coil and the pressure in the excitation chamber is determined, on the one hand, by inflow of fluid via a narrow passage and, on the other hand, by outflow of fluid through the control valve.

A damper of this type is disclosed in WO 96/08950.

The aim of the invention is so to improve the damper disclosed in the above publication that the movements of the valve body and the control valve are separately damped.

According to the invention, to this end the damper according to the preamble is characterized in that the hollow piston is movable in a control valve cylinder provided with orifices, that the control valve cylinder is movable within the excitation chamber, that a hollow shaft forms an integral part of said hollow piston and is guided in a valve shaft guide, that said hollow shaft is provided with orifices in communication with the hollow space of the hollow shaft and cooperating with the valve shaft guide so that the orifices are covered or uncovered—depending on the position of the hollow shaft relative to the valve shaft guide, and that the control valve cylinder and the control valve are pushed by spring means in the direction of the damping valve body.

If both the guide cylinder of the control valve piston and the guide of the control valve shaft have play in the radial direction, a low-friction position control of the control valve can be achieved with low coil forces. An out-of-true position or jamming cannot occur.

The invention will be explained in more detail below with reference to the figures.

Figure 1:
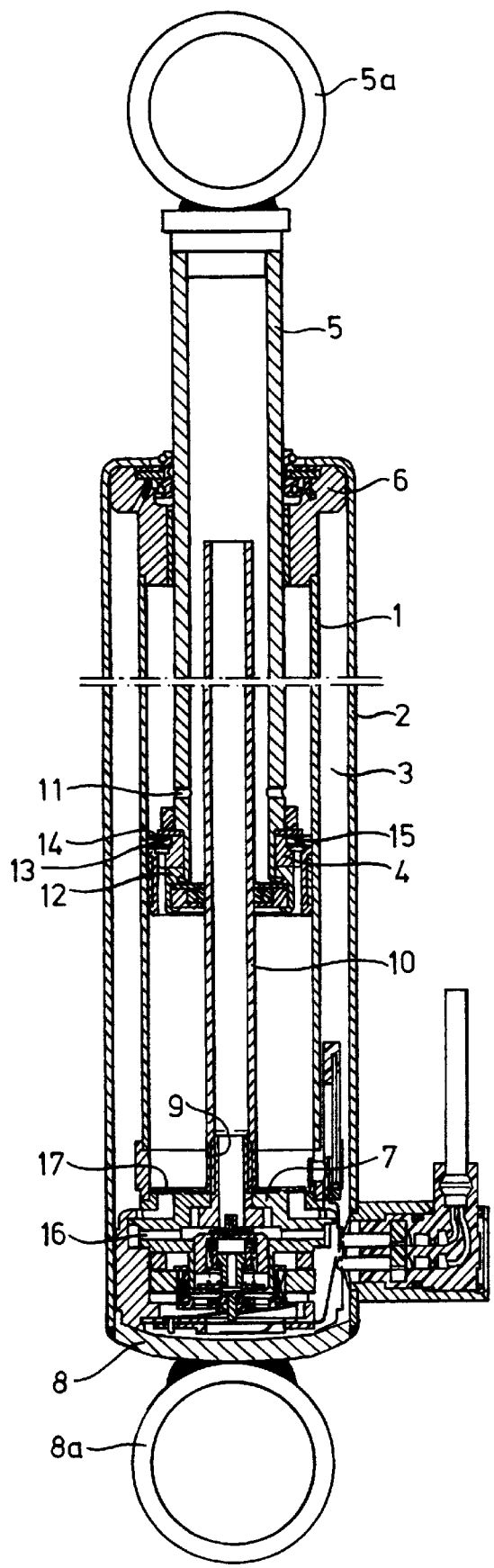
FIG. 1 shows a longitudinal section of a first embodiment.

The continuously variable twin-tube shock damper shown in FIG. 1 comprises a working cylinder, constructed as inner tube 1, an outer tube 2, a reservoir 3 between the working cylinder and the outer tube, a piston 4, which is movable within the working cylinder, a hollow piston rod 5 with fixing eye 5a, which can be connected to the sprung part of a wheel suspension unit, a cover 6 which closes off the working cylinder and the reservoir and forms a guide for the piston rod, a disc or foot valve housing 7 at the bottom of the working cylinder and a baseplate 8 with fixing eye 8a at the bottom of the outer tube.

A central tube 10, the bottom end of which protrudes through the foot valve housing 7, extends through the piston 4.

Openings 11 are made in the piston rod just above the piston 4, which openings connect the base above the piston to the interior of the piston rod 5. The top of the central tube 10 is located above the opening 11.

The piston is provided with a valve housing 12, a valve seat 13 and a valve body 14, which is pushed onto the seat 13 by a spring 15. The components 12 to 15 form an upstream valve.

Orifices 16 are made in the foot valve housing 7, which orifices are provided at the top of a spring-loaded upstream valve 17.

An excitation chamber 18, which has a cylindrical section in which a beaker-shaped piston 19 is movable, is located below the housing 7. At the top, said beaker-shaped piston has a section which has an axial orifice 20. A valve body 21, which forms part of the damping valve, is placed on the top section of the beaker-shaped piston 19. The seat of the damping valve is located at the broadened underside of a tube section 9 screwed to the bottom of the central tube 10. The upper surface of the broadened section of said tube section 9 engages on the foot valve housing 7.

It will be clear that during the outgoing stroke the oil above the piston 4 is forced through the openings 11 towards the central tube 10. In the vicinity of the foot of said tube 10, the oil flows through the damping valve 7, 21 to the channels 16 and via the upstream valve 17 into the space below the piston. During the ingoing stroke, the oil beneath the piston 4 will flow through the upstream valve 12, 13, 14 to the space above the piston 4, which space is becoming larger. An oil volume which corresponds to the volume of that part of the piston rod 5 which penetrates into the working cylinder 1 likewise flows through the central tube 10 to the damping valve 7, 21 and after passing through said valve passes via the openings 16 into the reservoir 3. The upstream valve 13, 14, 15 of the piston 4 gives rise to negligible damping; the damping action is produced by the damping valve 7, 21. The magnitude of the damping is determined by the servo-control system located below the valve body 21.

A relatively small cylinder 22 is arranged so that it is movable with lateral play inside the beaker-shaped piston 19 and said small cylinder is pushed by a helical spring 23 towards the bottom surface of the base of the piston 19. Radial bores 24 are present in the uppermost part of the relatively small cylinder 22. A hollow piston 25 is movable inside the small cylinder 22 by means of a shaft-shaped section 27, which is movable in a valve shaft guide 26. One or more radial bores 28 have been made in the shaft-shaped section 25. Said bores are covered or uncovered—depending on the position of the piston shaft 27 relative to the guide 26. A helical spring 29 exerts an upward load on the piston 25.

A coil 30 is arranged around the outside of the excitation chamber, which coil is a small distance away from a permanent magnet 31 and can be moved up and down by electrical excitation. The coil 30 is connected to the shaft section 27 of the hollow piston 25.

Electrical excitation of the coil leads to upward or downward movement thereof, during which movement either the piston 25 is moved downwards against the pretensioning of the spring 29 and, therefore, the control valve is pulled open, or, as a result of reversal of the direction of the current, the piston is moved together with the pretensioning of the spring 29 in the direction of closure. In the first case (opening of the control valve), the oil pressure below the beaker-shaped piston 19 becomes lower, with the result that the damping valve opens more rapidly and damps to a lesser extent. In the second case (closing of the control valve), the oil pressure below the beaker-shaped piston 19 becomes higher as a result of which the damping valve opens with more difficulty and damps to a greater extent.

In fact, the pressure in the excitation chamber 18 is controlled by a force equilibrium between a force which is the consequence of oil pressure on a surface the magnitude of the shaft section 27 of the control valve, a force generated by the spring tensioning of the spring 29 and a force which is the consequence of the electromagnetic force of the coil 30. Triggering of the coil 30 is effected from an electronic control unit via cable 32, conductor pins 33, line 34, laminated springs 35 and resilient tongues 36. The laminated springs 35 have a negligible influence on the vertical position of the coil 30.

The shock damper also has a direction sensor 37 which, by means of a mechanical contact, or by measurement of a movement by means of coils in accordance with the Hall effect, or piezo-electrically, converts the pressure difference between the bottom of the cylinder and the reservoir 3 into a signal which indicates the direction of movement of the piston rod. Via resilient pins 38 and conductor pins 39, the direction sensor 37 connects a cable 37 to the electronic control unit (ECU).

The pressure in the excitation chamber 18 is determined by the inflow of liquid via the passage 20 and the outflow of liquid via the radial bores 28.

As a consequence of the abovementioned force equilibrium, there is an indirect feedback relationship between the current through the coil 30 and the damping force on the piston rod 5.

When the coil 30 is not excited (fail-safe position), the pretensioning of the helical spring 29 and the cross-sectional surface area of the shaft 27 of the control valve determine the pressure in a highly controlled manner, liquid issuing from the excitation chamber. Said pressure can be so chosen that the damping force constitutes an average between the maximum and minimum damping force. The fail-safe position (without control) is automatically ensured.

The relatively small cylinder 22 and the valve shaft guide 26 have some radial play. Consequently, low-friction position control of the control valve 25, 26 can be achieved with low force from the exciter coil 30.

The movements of the piston 19 in the chamber 18 cause a certain amount of damper fluid to move, with the entire surface of the piston as displacement surface and with a resistance to flow, when control valve 25, 27 is stationary, caused by the radial bores 24 in the small cylinder 22. Conversely, any movement of the control valve 25, 27 when the piston 19 is stationary is damped in the openings 24 in the small cylinder 22. Consequently, there are two damping characteristics. The piston 19 with piston helical spring 22, on the one hand, and the valve shaft 27 with coil 30 and helical spring 29, on the other hand, give two different inherent frequencies and two different damping values.

Figure 2:
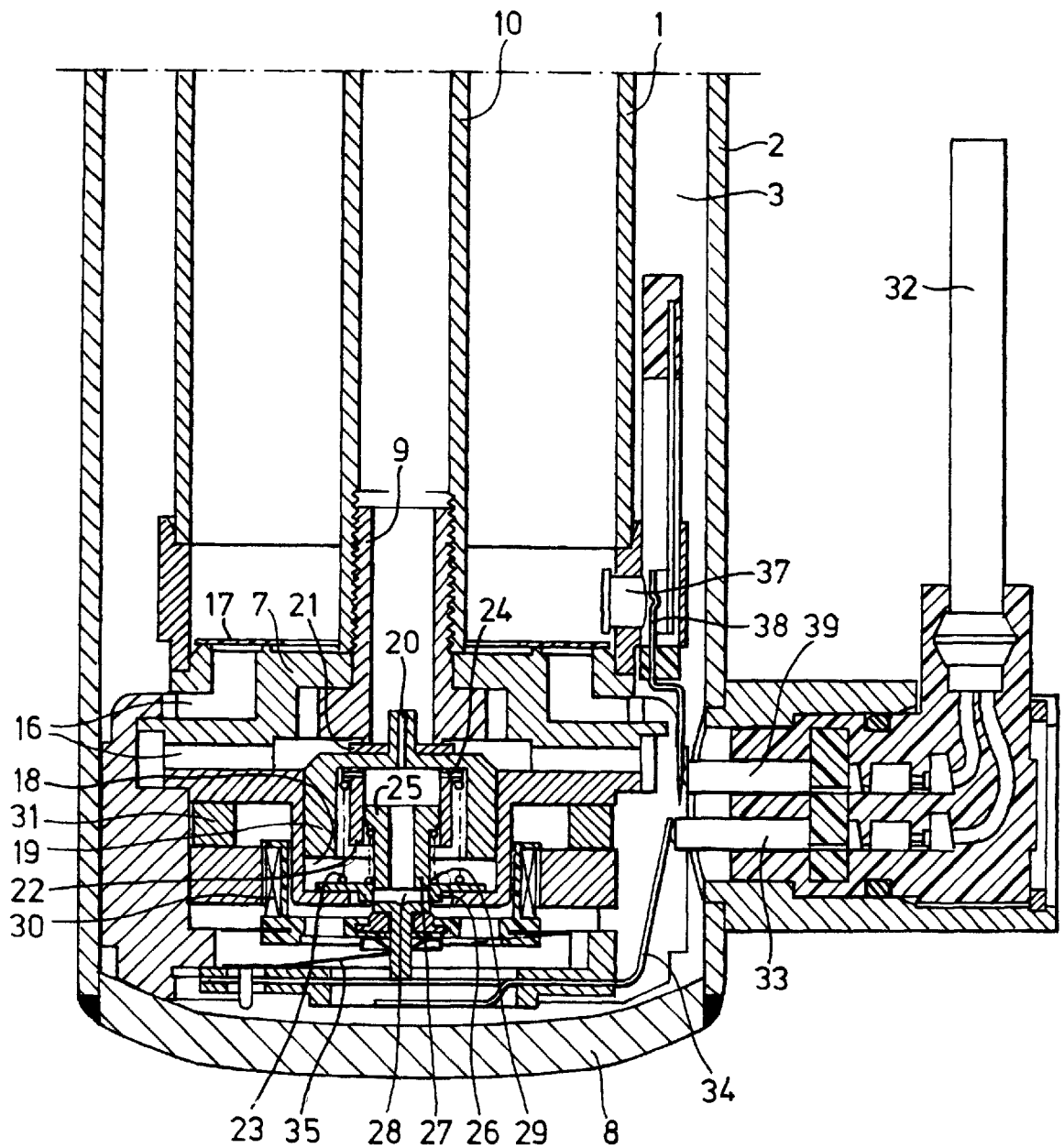
FIG. 2 shows a longitudinal section of the bottom section of the embodiment according to FIG. 1 on a larger scale.
Figure 3:
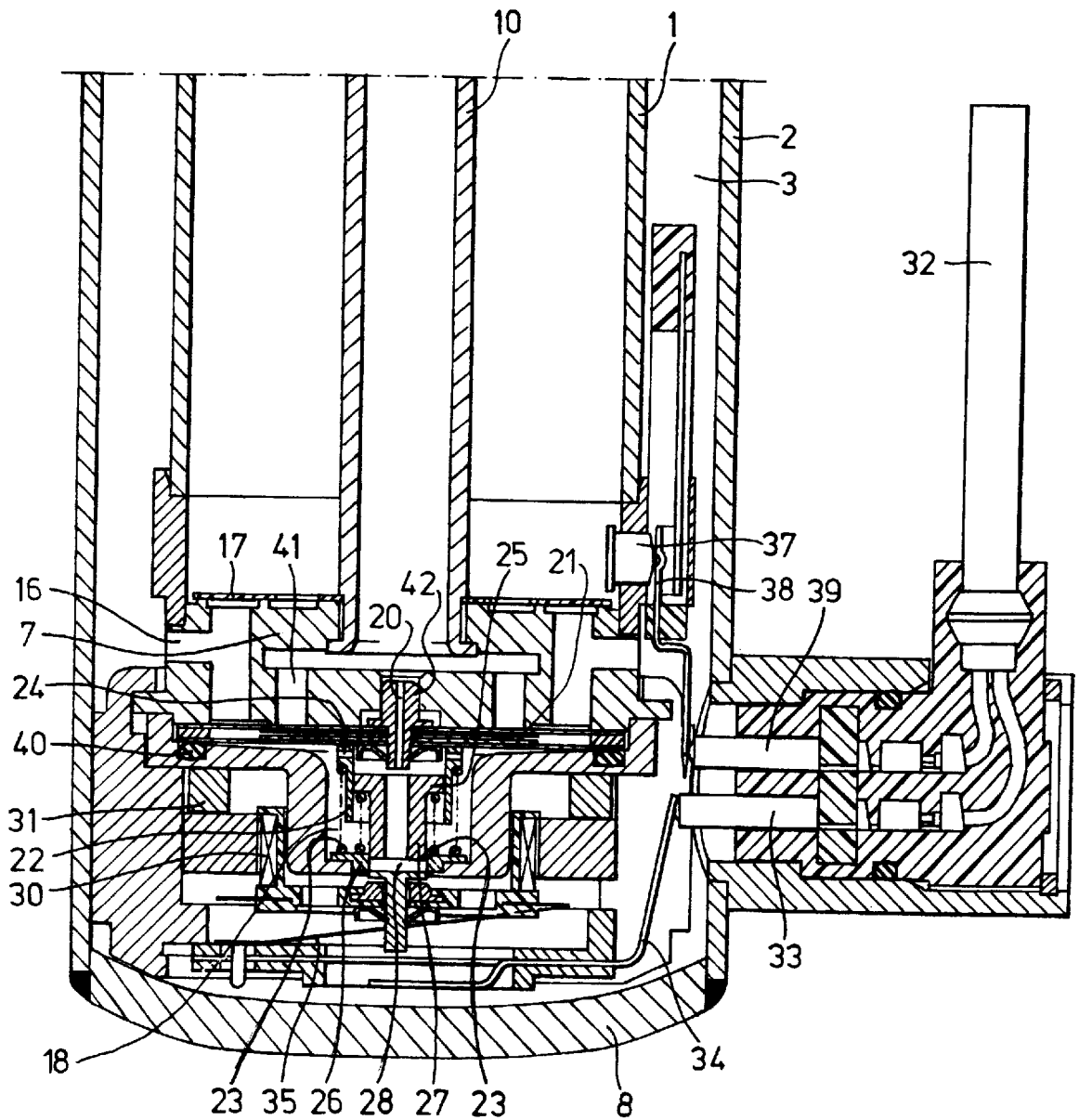
FIG. 3 shows a longitudinal section of the bottom section of a second embodiment.

The invention according to FIG. 3 differs from that according to FIGS. 1 and 2 in respect of the design of the damping valve and in that the beaker-shaped piston 19 has been dispensed with, as has the tube section 9 screwed into the bottom end of the central tube 10.

The valve body 21 is constructed as an assembly of a number of thin spring steel discs (membranes), which are held together by a centring pin 21a with spindle retaining ring. The axial passage 20 is made in the centring pin. The discs are fixed with some play at their circumference between the housing 7 and the wall of the excitation chamber 18. Sealing is effected by means of an O-ring or the like in a groove in the wall of the excitation chamber. In this case as well, the damping liquid supplied via the central tube is fed via orifices 41, 16 in the housing 7 into the reservoir 3, at least when the valve body 21 has moved free of the seat beneath the housing.

It will be clear that the servo-intensifying effect is achieved with a small surface area and a high pressure (up to 100 bar) above the valve body 21 and a large surface area and a low pressure (down to 4 bar) below the valve body 21. The functions which in the embodiment according to FIGS. 1 and 2 are fulfilled by the beaker-shaped piston 19 are taken over by the membrane valve body 21 in the embodiment according to FIG. 3. The side of the membrane package 21 which faces towards the excitation chamber 18 is subjected to the pressure which prevails in said chamber and which is controlled by the valve 25, 26 and the coil 30. The contact pressure of the package 21 against the seat at the bottom of the housing 7 can be controlled and consequently the resistance to flow of the liquid which flows from the openings 41 to the openings 16 proportionally to the electrical control current through the coil 30.

We claim:

1. Continuously variable twin-tube shock damper comprising:

an oil reservoir (3) between a working cylinder (1) and an outer tube (2), a piston (4) which is movable in the working cylinder (1) and has a passage and a non-return valve (12, 13, 14) which permits only an upward flow through the said passage with negligible damping capacity, a hollow piston rod (5) which extends towards the top of the working cylinder, a baseplate (8) which closes off the working cylinder, a disc (7) which has one or more passages (16; 41) and is arranged inside the working cylinder between the piston and the baseplate, a non-return valve (17) which permits only upward flow through said disc passages, a central tube (10) which protrudes through the piston into the hollow piston rod and through the said disc (7), a connection (11) between the hollow piston rod and the space above the piston, a damping valve (9,21;7,21) which operates in only one direction of flow and is arranged adjacent the bottom of the central tube, servo-control means to control the flow resistance exerted by the damping valve as a function of electrical signals which are at least related to the movement of a bodywork and/or chassis, which servo-control means comprise an excitation chamber (18) as well as a coil (30) positioned in the vicinity of a permanent magnet (31), which coil (30) can be excited by the said electrical signals in order to control the pressure in the excitation chamber below a valve body (21) of the damping valve (9,21;7,21), a control valve (25,27) having the form of a hollow piston (25) which is arranged in the excitation chamber (24), wherein the position of the control valve (25,27) can be changed by excitation of the coil (30) and the pressure in the excitation chamber (24) is determined, on the one hand, by inflow of fluid via a narrow passage (20) and, on the other hand, by outflow of fluid through the control valve (25,27), characterised in, that the hollow piston (25) is movable in a control valve cylinder (22) provided with orifices (24), that the control valve cylinder (22) is movable within the excitation chamber (18)

that a hollow shaft (27) forms an integral part of said hollow piston (25) and is guided in a valve shaft guide (26), that said hollow shaft (27) is provided with orifices (28) in communication with the hollow space of the hollow shaft (27) and cooperating with the valve shaft guide (26) so that the orifices are covered or uncovered— depending on the position of the hollow shaft (27) relative to the valve shaft guide (26), and that the control valve cylinder (22) and the control valve (25,27) are pushed by spring means (23, 29) in the direction of the damping valve body (21).

2. Shock damper according to claim 1, characterised in that the valve body (21) of the damping valve is combined with a piston (19) which has a liquid passage, which piston is movable up and down inside a cylindrical wall in the excitation chamber (18).

3. Shock damper according to claim 1, characterised in that the valve body (21) of the damping valve is composed of a number of spring steel discs held together by a centering pin (42) provided with a liquid passage (20).

4. Shock damper according to claim 1, characterised in that in the case of a non-excited coil, pretensioning of the spring means (29) on the control valve piston (25, 27) and the cross-sectional surface area of hollow shaft (27) are determined in such a way that the damping force constitutes a mean of the maximum and minimum achievable damping force at the top of the piston rod.

5. Shock damper according to claim 1, characterised in that a direction sensor (37) is fitted in the shock damper, which direction sensor converts the pressure difference between the bottom of the working cylinder (1) and the reservoir (3) into a signal and transmits said signal to an electronic control unit which transmits the electrical signals to the coil (30).

6. Shock damper according to claim 1, characterised in that both the control valve guide cylinder (22) and the valve shaft guide (26) have play in the radial direction.

* * * * *